(12) United States Patent
Shepelev

(10) Patent No.: US 10,761,659 B2
(45) Date of Patent: Sep. 1, 2020

(54) MITIGATING ELECTROMAGNETIC EMISSIONS FROM SENSOR ELECTRODES

(71) Applicant: Synaptics Incorporated, San Jose, CA (US)

(72) Inventor: Petr Shepelev, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 113 days.

(21) Appl. No.: 15/917,457

(22) Filed: Mar. 9, 2018

(65) Prior Publication Data

US 2019/0278396 A1 Sep. 12, 2019

(51) Int. Cl.
*G06F 3/044* (2006.01)

(52) U.S. Cl.
CPC ................... *G06F 3/044* (2013.01)

(58) Field of Classification Search
CPC ........... G06F 3/041; G06F 3/044; G06F 3/046
See application file for complete search history.

(56) References Cited

U.S. PATENT DOCUMENTS

2014/0226083 A1* 8/2014 Dunphy .................. G06F 3/044
349/12
2015/0091849 A1* 4/2015 Ludden ................. G06F 3/0412
345/174
2015/0378467 A1* 12/2015 Hoch ...................... G06F 3/044
345/174

* cited by examiner

*Primary Examiner* — Kent W Chang
*Assistant Examiner* — Chayce R Bibbee
(74) *Attorney, Agent, or Firm* — Ferguson Braswell Fraser Kubasta PC

(57) ABSTRACT

An input device is disclosed. The input device includes: multiple sensor electrodes; and a processing system configured to: modulate a first sensor electrode of the multiple sensor electrodes with a guard signal; and mitigate electromagnetic emissions resulting from modulating the first sensor electrode with the guard signal by modulating a circuit element with an inverted version of the guard signal.

21 Claims, 9 Drawing Sheets

MITIGATING ELECTROMAGNETIC EMISSIONS FROM SENSOR ELECTRODES

TECHNICAL FIELD

The described embodiments relate generally to electronic devices, and more specifically, to mitigating electromagnetic emissions from capacitive sensor electrodes.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

Input devices, which include touchscreens, often generate electromagnetic emissions during capacitive sensing. However, an input device is often used with other components (e.g., automotive components) that require the observed/measured electromagnetic emissions from the input device to be small (i.e., below a threshold). Accordingly, it may be desirable to include additional components in the input device and/or operate the input device to mitigate (e.g., reduce or even cancel) the observed/measured electromagnetic emissions from the input device.

SUMMARY

In general, in one aspect, embodiments are related to an input device. The input device comprises: a plurality of sensor electrodes; and a processing system configured to: modulate a first sensor electrode of the plurality of sensor electrodes with a guard signal; and mitigate electromagnetic emissions resulting from modulating the first sensor electrode with the guard signal by modulating a circuit element with an inverted version of the guard signal.

In general, in one aspect, embodiments are related to a method for operating an input device comprising a plurality of sensor electrodes and a display screen. The method comprises: modulating the plurality of sensor electrodes with a sensing signal; applying a guard signal to a gate line associated with the display screen; and reducing electromagnetic emissions resulting from modulating the plurality of sensor electrodes with the sensing signal by modulating a conductive path at least partially surrounding the plurality of sensor electrodes with an inverted version of the guard signal.

In general, in one aspect, embodiments are related to a method for operating an input device comprising a first sensor electrode and a second sensor electrode. The method comprises: modulating the first sensor electrode with a guard signal; and reducing electromagnetic emissions resulting from modulating the first sensor electrode with the guard signal by modulating the second sensor electrode with an inverted version of the guard signal.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments disclose input devices and methods that facilitate improved usability. Specifically, one or more embodiments disclose electronic components and/or methods for mitigating electromagnetic emissions from the input device. Mitigating electromagnetic emissions from the input device may be important for the input device to be compliant with (and thus operational with) the requirements of another component (e.g., automotive component).

Figure 1:
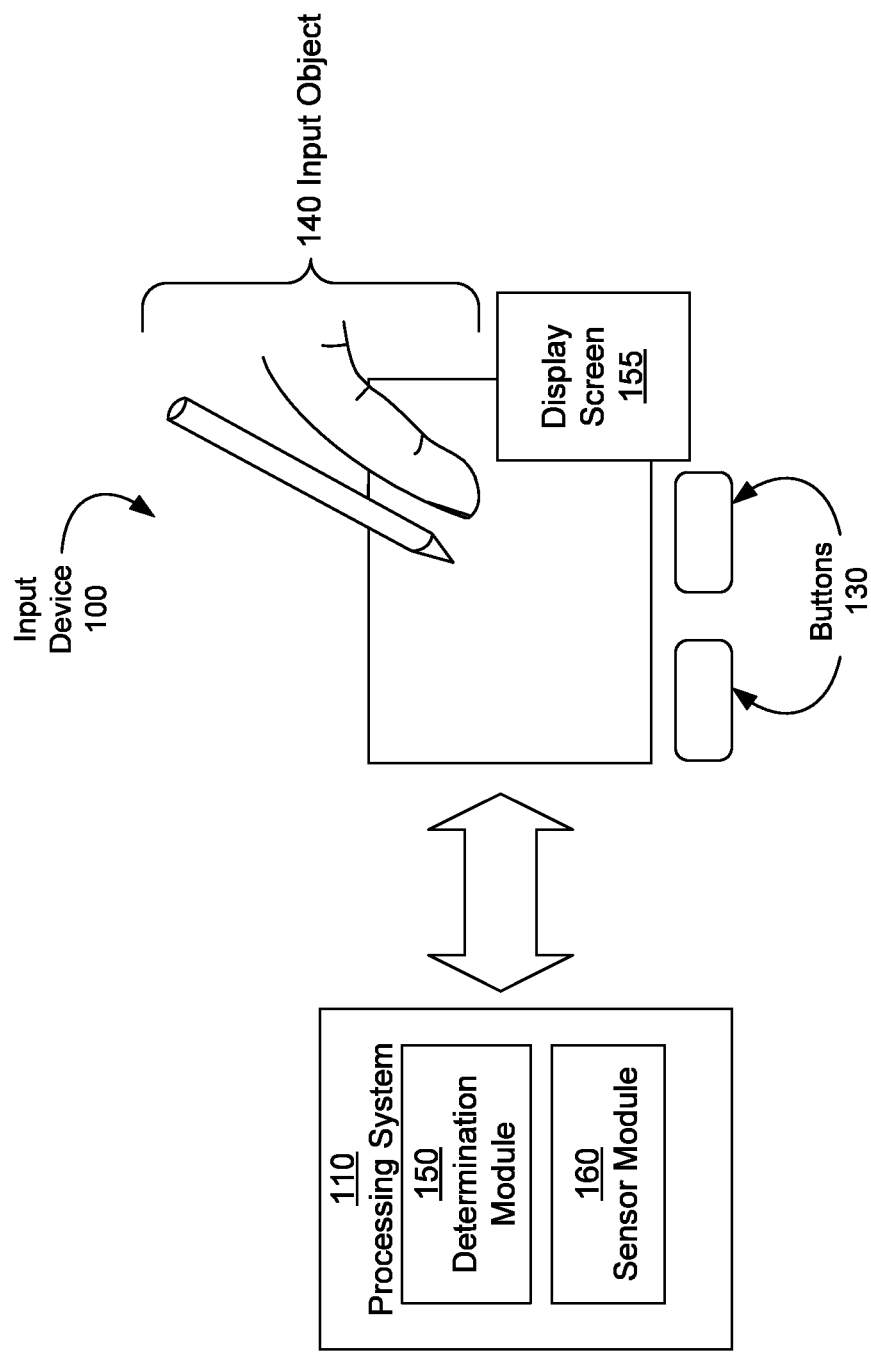
FIG. 1 and FIG. 2 show a block diagram of an input device in accordance with one or more embodiments.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) detects inputs involving no physical contact with any surfaces of the input device (100). In other embodiments, the sensing region (120) detects inputs involving contact with an input surface (e.g., a touch screen) of the input device (100) coupled with some amount of applied force or pressure.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. The input device (100) may also include one or more physical or virtual buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "transcapacitance"). Absolute capacitance sensing methods detect changes in the capacitive coupling between sensor electrodes and an input object. Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc. For example, the processing system (110) may be part of an integrated touch and display controller.

In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional circuitry may exist in accordance with one or more embodiments of the disclosure.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

In some embodiments, the input device (100) includes a touch screen interface, and the sensing region (120) overlaps at least part of an active area of a display screen (155). The input device (100) may include substantially transparent sensor electrodes overlaying the display screen (155) and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen (155) may be operated in part or in total by the processing system (110).

The sensing region (120) and the display screen (155) may be integrated and follow on-cell or in-cell or hybrid architectures. In other words, display screen (155) may be composed of multiple layers (e.g., one or more polarizer layers, color filter layers, color filter glass layers, thin film transistor (TFT) circuit layers, liquid crystal material layers, TFT glass layers, etc.). The sensor electrodes may be disposed on one or more of the layers. For example, the sensor electrodes may be disposed on the TFT glass layer and/or the color filter glass layer. Moreover, the processing system (110) may be part of an integrated touch and display controller that operates both the display functions and the touch sensing functions.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or microcore of a computer processor with shared memory and/or resources.

FIG. 1 shows a configuration of components, other configurations may be used without departing from the scope of the disclosure. For example, various components may be combined to create a single component. As another example, the functionality performed by a single component may be performed by two or more components.

Figure 2:
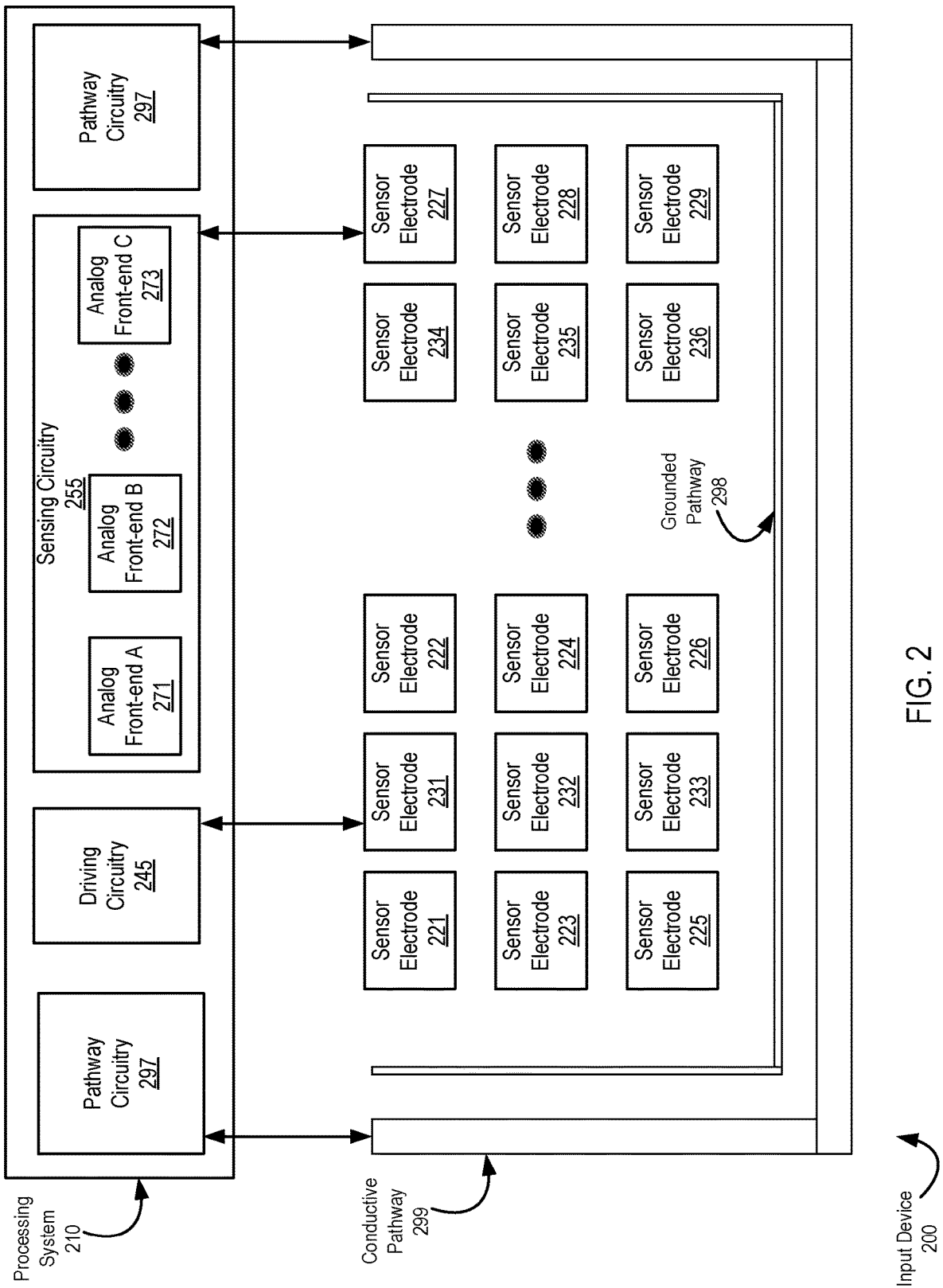

FIG. 2 shows a schematic view of an input device (200) in accordance with one or more embodiments. As shown in FIG. 2, the input device (200) may include a processing system (210), multiple sensor electrodes (221-229, 231-236) arranged in a matrix with rows and columns, a conductive pathway (299) that surrounds the sensor electrodes (221-229, 231-236), and a grounded pathway (298) located between the conductive pathway (299) and the sensor electrodes (221-229, 231-236). The conductive pathway (299) and/or the grounded pathway (298) may be composed of a set of segments (i.e., one or more segments). Although not shown, there may be gaps between the segments. In one or more embodiments, the conductive pathway (299) may be used to protect the processing system (210) and/or sensor electrodes (221-229, 231-236) against electrostatic discharge form touch on the edges of the input device (200). The conductive pathway (299) is further described below. The conductive pathway (299) and each sensor electrode (221-229, 231-236) are examples of a circuit element.

As discussed above, the input device (200) may include an integrated display screen (not shown). Accordingly, the input device (200) may also include gate lines and source lines involved in updating the display screen. Moreover, one or more of the sensor electrodes (221-229, 231-236) may correspond to VCOM segments also involved in updating the display screen.

In one or more embodiments, the processing system (210) is similar to processing system (110), described above in reference to FIG. 1. As shown in FIG. 2, the processing system (210) may include pathway circuitry (297), driving circuitry (245), and sensing circuitry (255) with one or more analog front-ends (AFEs) (i.e., AFE A (271), AFE B (272), AFE C (273)). Although the driving circuitry (245) and the sensing circuitry (255) are shown as being separate in FIG. 2, in one or more embodiments, the driving circuitry (245) and the sensing circuitry (255) are integrated.

In one or more embodiments, the sensing circuitry (255) includes hardware and/or software with functionality to obtain one or more resulting signals from one or more sensor electrodes (221-229, 231-236). Specifically, resulting signals may be obtained from sensor electrodes involved in capacitance sensing (e.g., absolute capacitance sensing, transcapacitance sensing, etc.). The sensing circuitry (255) may be similar to the receiver circuitry described in FIG. 1 and the accompanying description.

In particular, the sensing circuitry (255) may include various analog front-ends (AFEs) (e.g., AFE A (270, AFE B (272), AFE C (273)) with analog conditioning circuitry. For example, AFEs may include operational amplifiers, digital-signal processing components, charge collection mechanisms, filters, current conveyors, and/or various application-specific integrated circuits for detecting and analyzing resulting signals (e.g., determining the location of an input object, estimating the force applied by the input object, etc.) obtained from the sensor electrodes. In one or more embodiments, the number of AFEs (271-273) is less than the number of sensor electrodes (221-229, 231-236).

In one or more embodiments, some or all of the sensor electrodes (221-229, 231-236) are used to perform absolute capacitance sensing (e.g., when the display screen is not being updated). During absolute capacitance sensing, the sensor electrodes may be modulated with a sensing signal. The sensing signal may be a periodic signal, such as a square wave, a sine wave, a triangular wave, etc. Further, a guard signal having substantially the same shape and phase as the sensing signal may be applied to the gate lines and/or source lines. The guard signal may also be applied to the sensor electrodes that are not being utilized for touch sensing (discussed below).

Figure 3A:
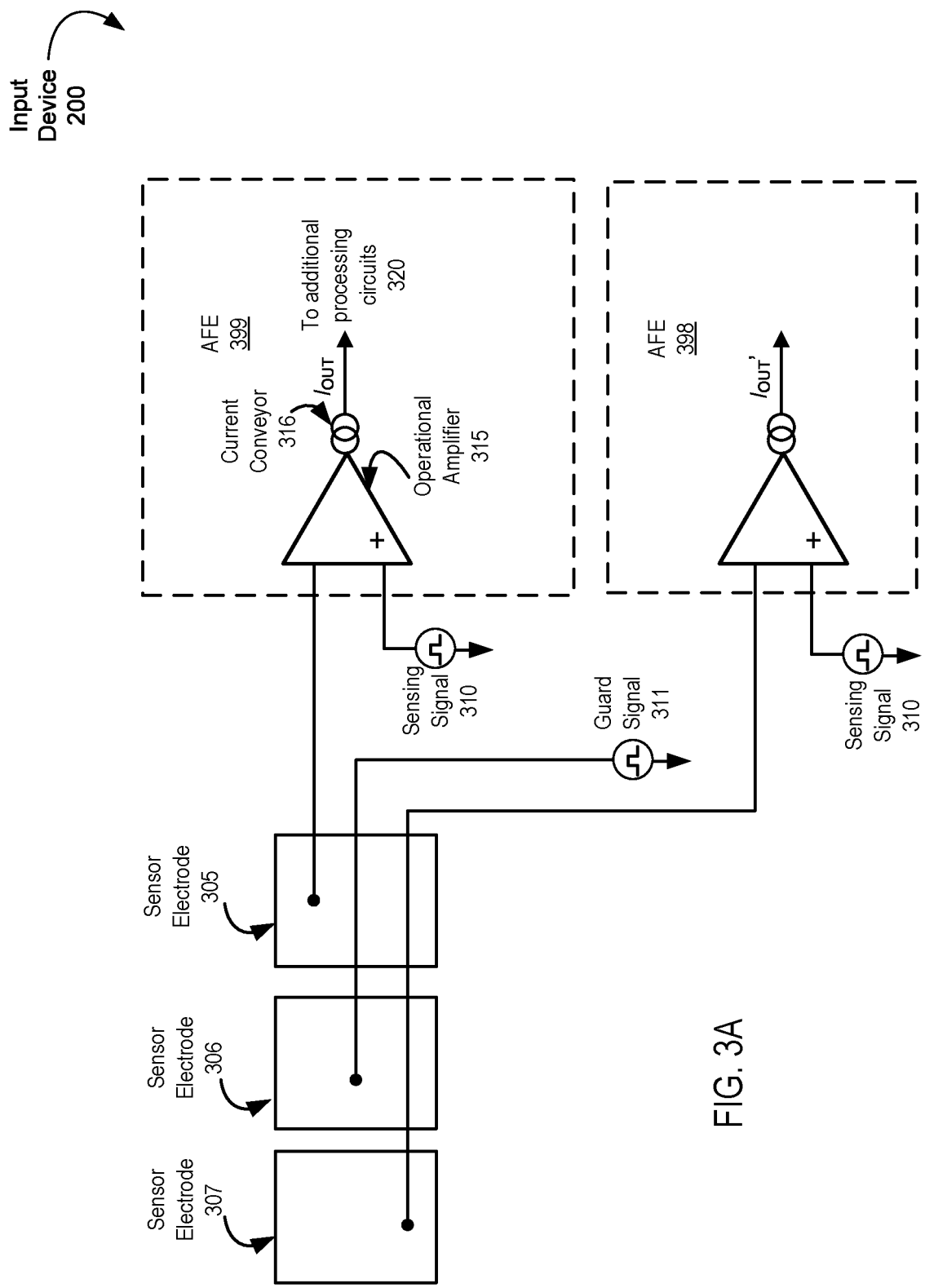
FIG. 3A and FIG. 3B show an input device configured for capacitive sensing in accordance with one or more embodiments.

FIG. 3A shows the input device (200) configured for absolute capacitance sensing in accordance with one or more embodiments. As shown in FIG. 3A, there are multiple sensor electrodes (i.e., sensor electrode (305), sensor electrode (306), sensor electrode (307)). Each of the sensor electrodes (305-307) may correspond to any of the sensor electrodes (221-229, 231-236) discussed above in reference to FIG. 2. Accordingly, the sensor electrodes (305-307) may all be in the same column. Alternatively, at least two of the sensor electrodes (305-307) may be in different columns.

As also shown in FIG. 3A, there are multiple AFEs (e.g., AFE (399), AFE (398)). Each of the AFEs (398, 399) may correspond to any of the AFEs (271-273) discussed above in reference to FIG. 2. AFE (399) includes an operational amplifier (315), a current conveyor (316), and additional processing circuits (320). AFE (398) may have essentially the same components as AFE (399). Further, sensing signal (310) is applied to the non-inverting terminals of the operational amplifiers (e.g., operational amplifier (315)) in the AFEs (398, 399).

Still referring to FIG. 3A, sensor electrode (307) and sensor electrode (305) are coupled to AFE (398) and AFE (399), respectively. Accordingly, both of the sensor electrodes (305, 307) are being modulated by sensing signal (310) and are being utilized to perform absolute capacitance sensing. Specifically, current $I_{OUT}$ in AFE (399) reflects the capacitive coupling of an input object, if any, with sensor electrode (305). Similarly, current $I_{OUT}'$ in AFE (398) reflects the capacitive coupling of an input object, if any, with sensor electrode (307). Sensor electrode (306) is driven by guard signal (311) having substantially the same shape and phase as the sensing signal (310). In fact, in one or more embodiments, the sensing signal and the guard signal are the same. However, as sensor electrode (306) is not coupled to an AFE, sensor electrode (306) is not currently being utilized to detect the presence of an input object.

As discussed above, FIG. 3A shows: (i) some sensor electrodes (305, 307) coupled to AFEs and being utilized to detect the presence of an input object; and (ii) at least one sensor electrode (306) being modulated by the guard signal but not coupled to an AFE and thus not being utilized to detect the presence of an input object. In one or more embodiments, the input device (300) may have switches and/or multiplexers (not shown) that can couple any sensor electrode (305-307) to any AFE (398, 399), and drive any sensor electrode (305-307) with the guard signal (311).

In one or more embodiments, modulating the sensor electrodes (305-307) with the sensing signal (310) and/or the guard signal (311) and applying the guard signal to the gate lines and/or source lines may result in electromagnetic emissions being observed/measured at some distance from the input device (200) (e.g., by a remote antenna).

Referring back to FIG. 2, in one or more embodiments, some or all of the sensor electrodes (221-229, 231-236) are used to perform transcapacitance sensing when the display screen is not being updated). During transcapacitance sensing, some of the sensor electrodes (221-229, 231-236) act as receiver electrodes and some of the sensor electrodes (221-229, 231-236) act as transmitter electrodes with the purpose of creating a difference in voltage applied to such pairs of electrodes. For example, during transcapacitance sensing, each sensor electrode in an even (or odd) column may act as a receiver electrode. The sensor electrodes in the remaining columns may act as transmitter electrodes.

Figure 3B:
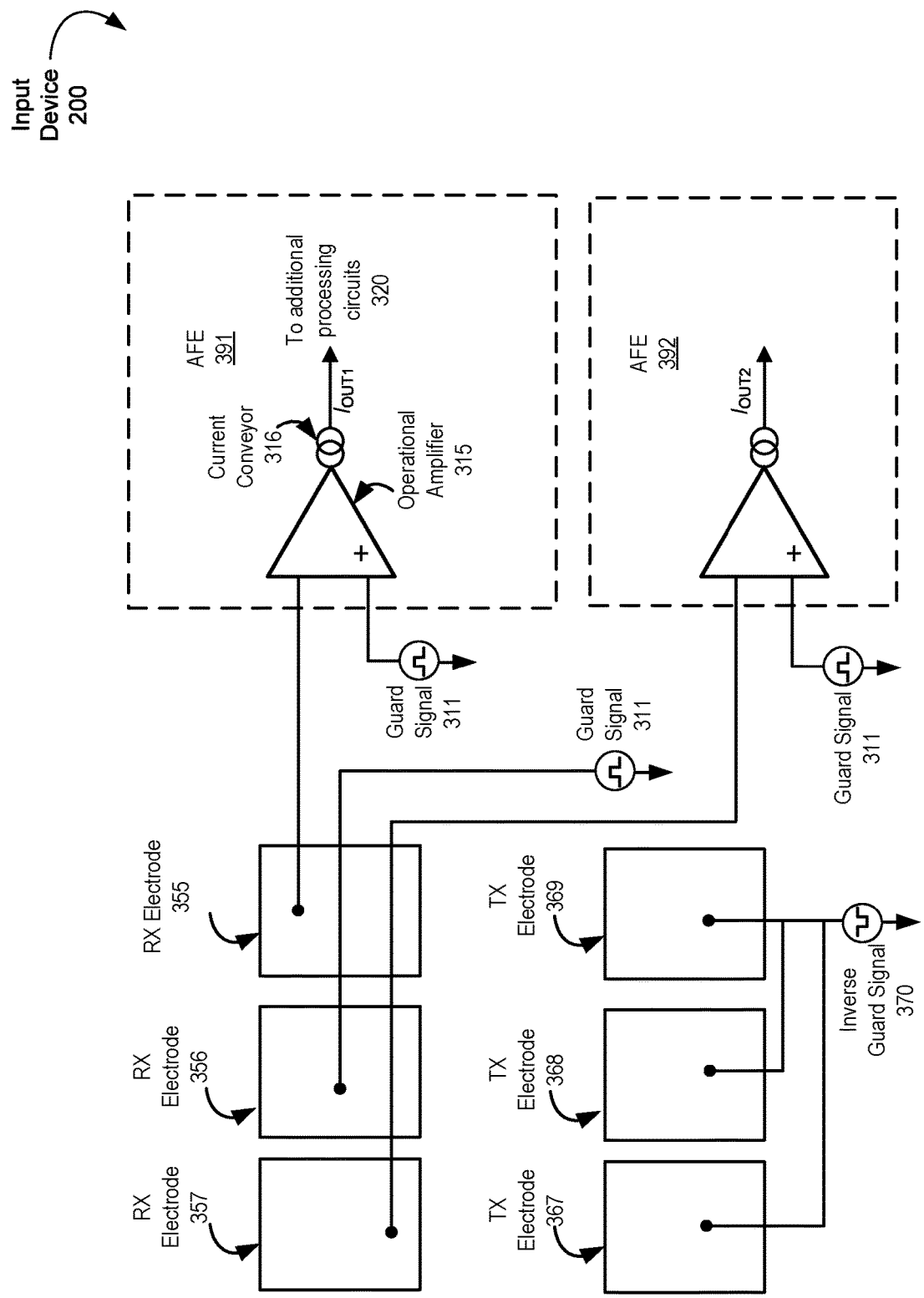

FIG. 3B shows the input device (200) configured for transcapacitance sensing in accordance with one or more embodiments. As shown in FIG. 3B, there are multiple transmitter (Tx) electrodes Tx electrode (367), Tx electrode (368), Tx electrode (369)) and multiple receiver (Rx) electrodes (i.e., Rx electrode (355), Rx electrode (356), Rx electrode (357)). Each of the TX electrodes is an example of a circuit element. Each of the Tx electrodes (367-369) may correspond to any of the sensor electrodes (221-229, 231-236) discussed above in reference to FIG. 2. Similarly, each of the Rx electrodes (355-357)) may correspond to any of the sensor electrodes (221-229, 231-236) discussed above in reference to FIG. 2. Each column may have both a Tx electrode and an RX electrode. Alternatively, a single column might have only Tx electrodes or only Rx electrodes.

As also shown in FIG. 3B, there are multiple AFEs (e.g., AFE (391), AFE (392)). Each of the AFEs (391, 392) may correspond to any of the AFEs (271-273), discussed above in reference to FIG. 2 or to AFE (399), discussed above in reference to FIG. 3A. Further, guard signal (311) is applied to the non-inverting terminals of the operational amplifiers in the AFEs (391, 392).

Still referring to FIG. 3B, Rx electrode (355) and Rx electrode (357) are coupled to AFE (391) and AFE (392), respectively. Accordingly, both of the Rx electrodes (355, 357) are being modulated by guard signal (310) and are being utilized to perform transcapacitance sensing. Specifically, current $I_{OUT1}$ AFE (391) reflects the change in the capacitive coupling between Rx electrode (355) with one or more of the Tx electrodes (367-369) due to the presence of an input object, if any. Similarly, current $I_{OUT2}$ in AFE (392) reflects the change in capacitance coupling between Rx electrode (357) with one or more of the Tx electrodes (367-369) due to the presence of an input object, if any. Rx electrode (356) is also modulated by guard signal (311). However, as sensor electrode (356) is not coupled to an AFE, sensor electrode (356) is not currently being utilized to detect the presence of an input object.

In one or more embodiments, modulating the Rx electrodes (355-357) with the guard signal (311) may result in electromagnetic emissions being observed/measured at some distance from the input device (200) (e.g., by a remote antenna). The guard signal (311) may also be applied to the gate lines and/or source lines, which may contribute to the electromagnetic emissions being observed/measured.

In one or more embodiments, the driving circuitry (245) has functionality to apply a DC signal to the Tx electrodes (355-357). Additionally or alternatively, and as shown in FIG. 3B, the driving circuitry (245) has functionality to apply an inverted version of the guard signal (370) to the Tx electrodes (367-369) (i.e., modulate the transmitter electrodes). The guard signal (311) and the inverted version of the guard signal may have the same or approximately the same frequency (370). However, the guard signal (311) and the inverted version of the guard signal (370) may be out of phase (e.g., 180 degrees out of phase) and have different amplitudes. By modulating the transmitter electrodes (367-369) with the inverted version of the guard signal (370) while the Rx electrodes (355-357) are being modulated with the guard signal (311), it is possible to perform transcapacitance sensing while also mitigating (e.g., reduce or even cancel) the electromagnetic emission observed/measured at some distance from the input device (200) (e.g., by a remote antenna).

In one or more embodiments, the input device (300) may have switches and/or multiplexers that can couple any electrode (355-357, 367-369) to any AFE (391, 392), and drive any sensor electrode (355-357, 367-369) with the guard signal (311) or the inverted version of the guard signal (370). Accordingly, it is possible to operate a sensor electrode as either transmitter electrode or receiver electrode.

Referring back to FIG. 2, in one or more embodiments, although multiple sensor electrodes act as receiver electrodes, only a subset of the receiver electrodes are used at a given time (e.g., T1) to perform transcapacitance sensing. Then, at time T2, another subset of the receiver electrodes are used to perform transcapacitance sensing. Then, at time T3, yet another subset of the receiver electrodes are used to perform transcapacitance sensing. This sequence of scans may continue until transcapacitance sensing has been performed across the entire (or a portion of the) sensing region (120). At each time point (i.e., T1, T2, T3, etc.), the receiver electrodes used to perform transcapacitance sensing may be coupled to a single AFE.

In one or more embodiments, by having multiple receiver electrodes coupled to a single AFE, an input device may increase the signal-to-noise ratio for proximity sensing of a sensing region. Moreover, having an AFE correspond to receiver electrodes only in a particular subset of columns in the matrix may minimize the length of analog traces on glass or inside silicon by reducing routing real estate and noise susceptibility.

Figure 4A:
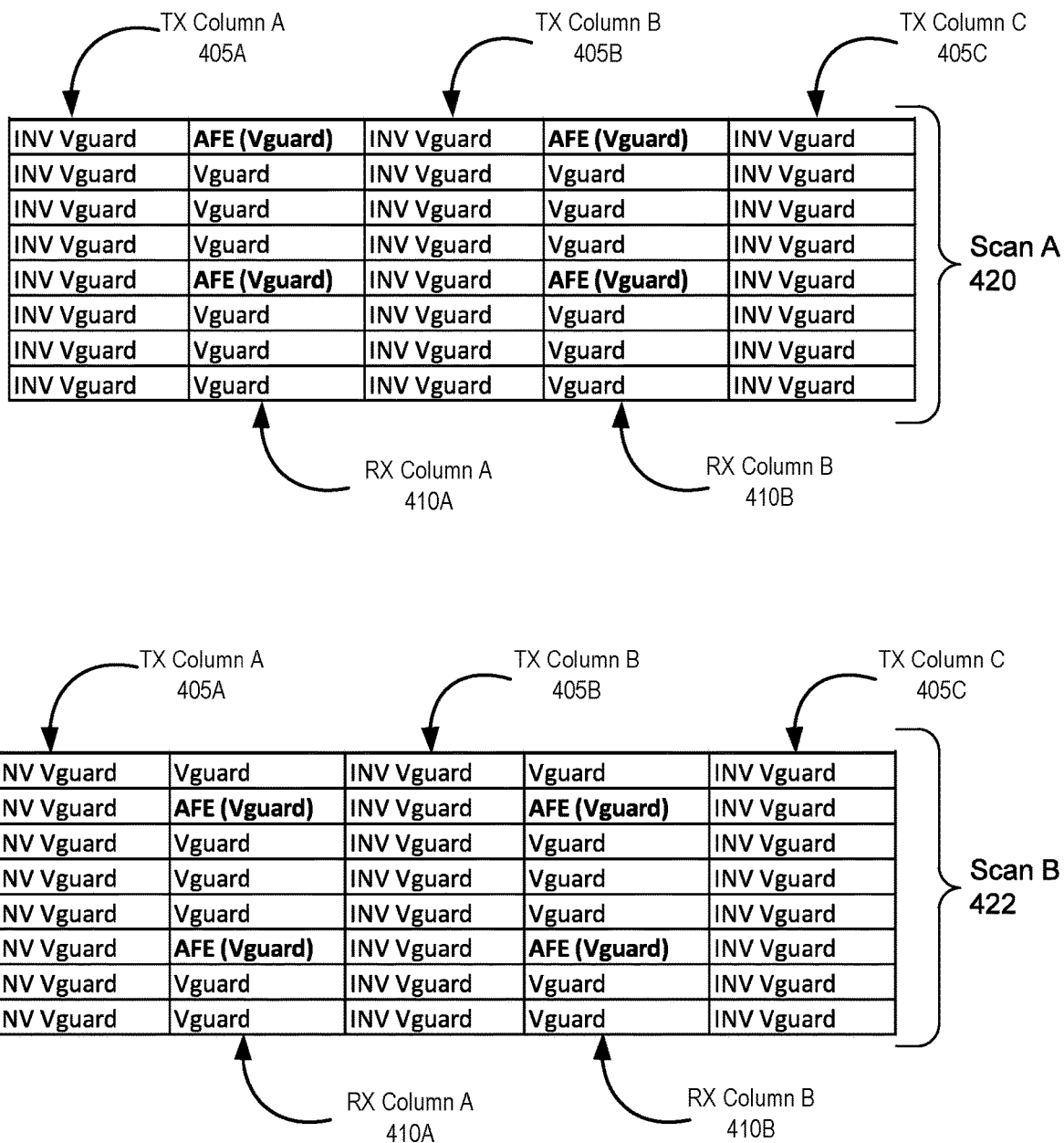
FIG. 4A and FIG. 4B show a scanning sequence in accordance with one or more embodiments.
Figure 4B:
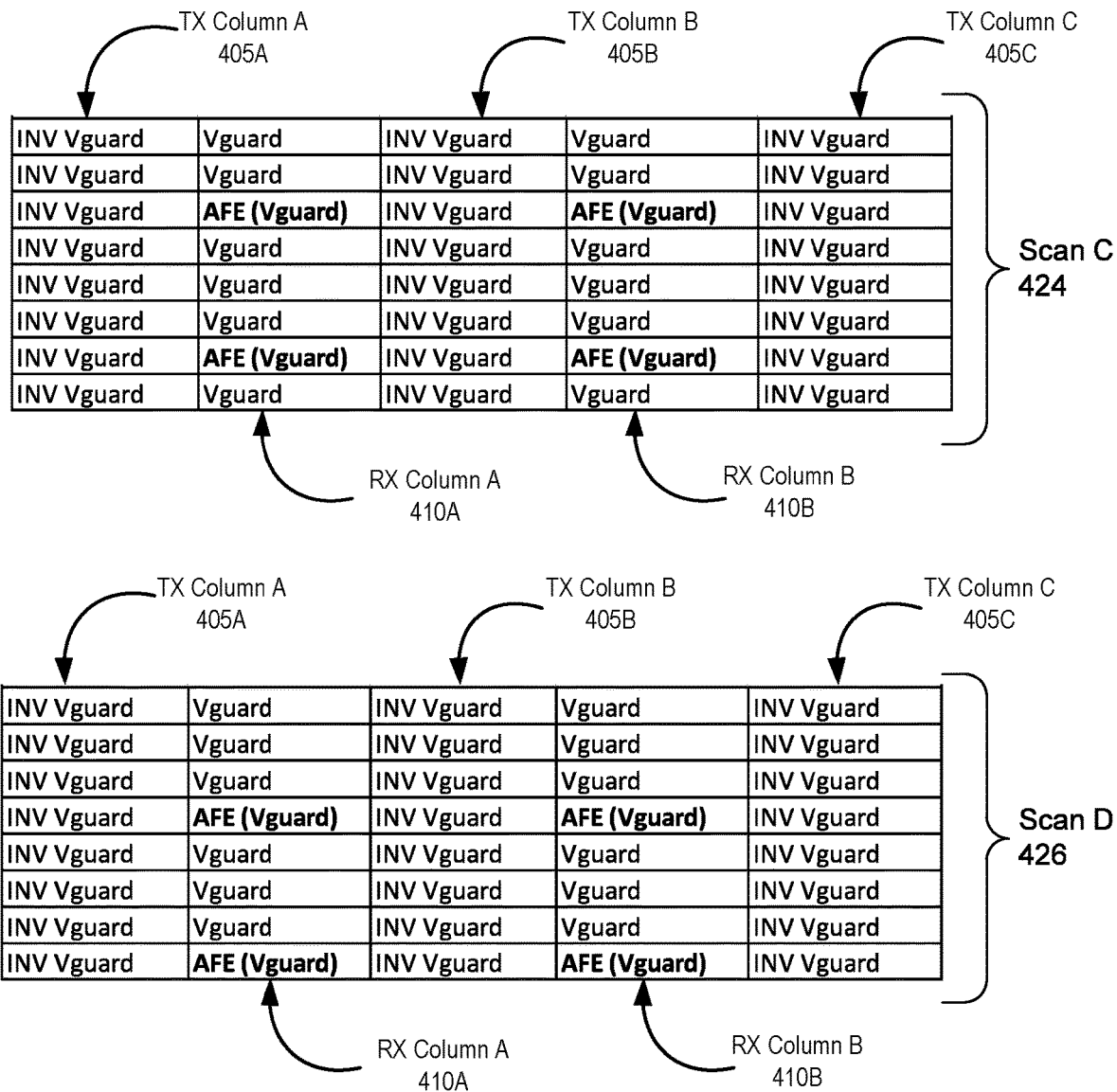

FIG. 4A and FIG. 4B show an example scanning sequence in accordance with one or more embodiments. In FIG. 4A and FIG. 4B, it is assumed the sensor electrodes form an 8×5 matrix. There are three columns of transmitter electrodes (i.e., TX Column A (405A), TX Column B (405B), and TX Column C (405CC)). The remaining two columns have receiver electrodes (i.e., RX Column A (410A), RX Column B (410B)). The example scanning sequence includes four scans: Scan A (420), Scan B (422), Scan C (424), and Scan D (426) that take place at four different times: T1, T2, T3, and T4.

In all four scans (420, 422, 424, 426), the transmitter electrodes in TX Column A (405A), TX Column B (405B), and TX Column C (405C) are modulated with the inverted version of the guard signal (INV Vguard). These transmitter electrodes are similar to any of Tx electrodes (367-369) in FIG. 3B. Moreover, in all four scans, all of the receiver electrodes are modulated with the guard signal (Vguard). As discussed above, by modulating the transmitter electrodes with the inverted version of the guard signal (INV Vguard), it is possible to mitigate the electromagnetic emissions resulting from modulating the receiver electrodes with the guard signal (Vguard). However, in each scan (420, 422, 424, 426), only two receiver electrodes in RX Column A (410A) (labelled as "AFE (Vguard)") and only two receiver electrodes in RX Column B (410B) (also labelled "AFE (Vguard)") are coupled to an AFE and used for transcapacitance sensing. These receiver electrodes are similar to either Rx electrode (357) or Rx electrode (355), discussed above in reference to FIG. 3B. The remaining receiver electrodes in each scan are being drive with the guard signal, but are not coupled to an AFE and are not being utilized to perform transcapacitance sensing. These remaining receiver electrodes are similar to Rx electrode (356), discussed above in reference to FIG. 3B.

Referring back to FIG. 2, in one or more embodiments, the pathway circuitry (297) has functionality to modulate the conductive pathway (299) with the inverted version of the guard signal (e.g., inverse guard signal (370)) during absolute capacitance sensing and/or transcapacitance sensing. By modulating the conductive pathway (299) with the inverted version of the guard signal (e.g., inverse guard signal (370)), it is possible to mitigate (e.g., reduce or even cancel) the electromagnetic emission observed/measured at some distance (e.g., by a remote antenna) from the input device (200), while the input device (200) is executing transcapacitance sensing or absolute capacitance sensing.

In one or more embodiments, the resistance of the conductive pathway (299) is affected by both temperature and bending (e.g., a bending force applied to the input device (200)). Accordingly, the pathway circuitry (297) may also have functionality to determine the resistance or change in resistance of the conductive pathway (299) for use in estimating the temperature change and/or bending force being applied to the input device (200). These estimates may be factors that go into updating the display (e.g., adjusting display gamma curves to compensate for temperature) and/or determining the location of the input object.

In one or more embodiments, the pathway circuitry (297) has functionality to modulate the conductive pathway (299) with an inverted version of the guard signal during the transcapacitance sensing. As discussed above, modulating the conductive pathway (299) with the inverted version of the guard signal while the receiver electrodes are being modulated with the guard signal, it is possible to mitigate (e.g., reduce or even cancel) the electromagnetic emission observed/measured at some distance (e.g., by a remote antenna) from the input device (200).

Figure 5:
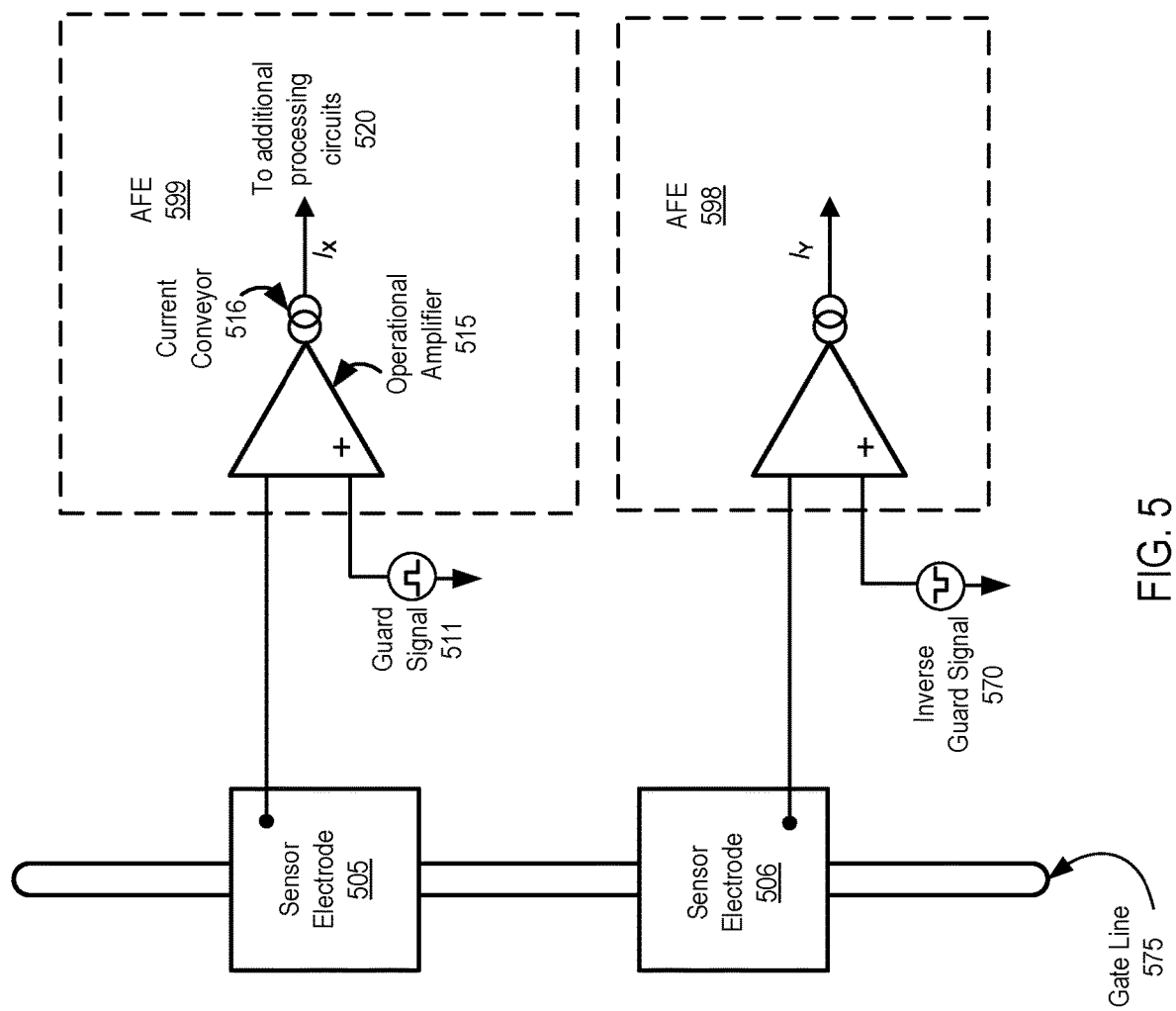
FIG. 5 shows an input device configured for capacitance sensing in accordance in one or more embodiments.

FIG. 5 shows the input device (200) configured for capacitive sensing in accordance with one or more embodiments. As shown in FIG. 5, sensor electrode (505) is coupled to AFE (599), while sensor electrode (506) is coupled to AFE (598). Each of the sensor electrodes (505, 506) may correspond to any of the sensor electrodes (221-229, 231-

236), discussed above in reference to FIG. 2 Each of the AFEs (598, 599) may correspond to any of the AFEs (271-273), also discussed above in reference to FIG. 2.

As shown in FIG. 5, AFE (599) includes an operational amplifier (515), a current conveyor (516), and additional processing circuitry (520). AFE (598) has components similar to AFE (599). AFE (599) modulates sensor electrode (505) with guard signal (511). The guard signal (511) may be a periodic signal, such as a square wave, a sine wave, a triangular wave, etc. AFE (598) modulates the sensor electrode (506) with the inverted version of the guard signal (570). The guard signal (511) and the inverted version of the guard signal (570) may have the same frequency but may have different amplitudes and/or be out of phase (e.g., out of phase by 180 degrees). Both sensor electrode (505) and sensor electrode (506) may be utilized for capacitive sensing. Specifically, current $I_X$ reflects the change in capacitive coupling between sensor electrode (505) and sensor electrode (506) due to an input object proximate to sensor electrode (505). Similarly, current $I_Y$ reflects the change in capacitive coupling between sensor electrode (506) and sensor electrode (505) due to an input object proximate to the sensor electrode (506), and it also includes a current caused by capacitance between sensor electrode (506) and gate line (576), which are driven by different signals (i.e., guard signal (511) and inverted version of the guard signal (570)).

In one or more embodiments, modulating sensor electrode (505) with the guard signal (511) may result in electromagnetic emissions being observed/measured at some distance from the input device (200) (e.g., by a remote antenna). The guard signal (511) may also be applied to the gate lines and/or source lines, which may contribute to the electromagnetic emissions being observed/measured. By modulating sensor electrode (506) with the inverted version of the guard signal (511), it is possible to mitigate (i.e., reduce or even cancel) the electromagnetic emissions being measured from the entire input device (200) or a subset of its sensor electrodes including one pair of sensor electrodes (505) and (506).

As discussed above, the input device (200) may have multiple gate lines and the guard signal (511) may also be applied to the gate lines. In FIG. 5, gate line (575) passes underneath (or above) both sensor electrode (505) and sensor electrode (506). However, because gate line (575) is driven with guard signal (511) while sensor electrode (506) is being modulated with the inverted version of the guard signal, additional current will be generated. Accordingly, a larger coarse baseline correction (CBC) will be needed for charge subtraction. FIG. 3B may be considered an alternative to the arrangement in FIG. 5, as the arrangement in FIG. 3B does not require the larger CBC.

Figure 6:
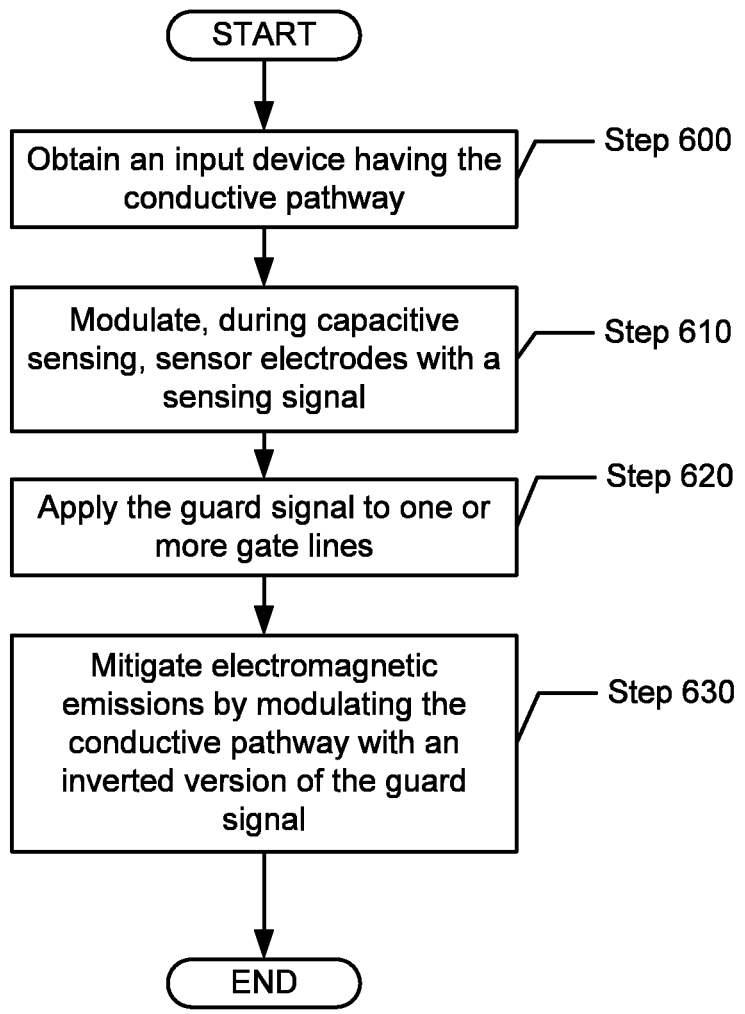
FIG. 6 and FIG. 7 show flowcharts in accordance with one or more embodiments.

FIG. 6 shows a flowchart in accordance with one or more embodiments. The flowchart of FIG. 6 depicts a method for operating an input device (e.g., input device (200)). One or more of the steps in FIG. 6 may be performed by the components of the processing system (210), discussed above in reference to FIG. 2. In one or more embodiments, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Initially, an input device is obtained (Step 600). The input device includes multiple sensor electrodes and a conductive pathway that surrounds the sensor electrodes. The conductive pathway may be composed of one or more segments with gaps between the segments. Optionally, the input device may include a grounded pathway located between the conductive pathway and the sensor electrodes. The input device may include a display screen along with gate lines and source lines used to update the display screen. Moreover, all or some of the sensor electrodes may correspond to VCOM segments also involved in updating the display screen.

In STEP 610, some or all of the sensor electrodes are used to perform capacitance sensing (e.g., absolute capacitance sensing, transcapacitance sensing). This includes modulating the sensor electrodes (or receiver electrodes in the case of transcapacitance sensing) with a sensing signal (e.g., a sine wave, a square wave, a triangular wave, etc.). Modulating the sensor electrodes with the sensing signal may result in electromagnetic emissions being observed/measured at some distance from the input device (200) (e.g., by a remote antenna). Capacitance sensing may be performed when the input screen, if present, is not updating.

In STEP 620, during the capacitive sensing, a guard signal may also be applied to the gate lines and/or the source lines. The guard signal is substantially similar in amplitude and phase to the sensing signal. By applying the guard signal to the gate lines and/or source lines, it is less likely that the sensor electrodes will capacitively couple with the gate lines and/or source lines, and thus less likely that the processing system will falsely identify the presence of an input object. Modulating the gate lines with the guard signal may also result in electromagnetic emissions being observed/measured at some distance from the input device (200) (e.g., by a remote antenna).

In Step 630, an attempt is made to mitigate the electromagnetic emissions. Specifically, this includes modulating the conductive pathway with an inverted version of the guard signal. The inverted version of the guard signal may have the same or substantially the same frequency as the guard signal, but may be out of phase with the guard signal (e.g., 180 degrees out of phase), and may have a different amplitude than the guard signal. Modulating the conductive pathway with the inverted version of the guard signal will generate electromagnetic emissions that mitigate (i.e., reduce or even cancel) the electromagnetic emissions resulting from the modulation of the sensor electrode and gate lines.

Figure 7:
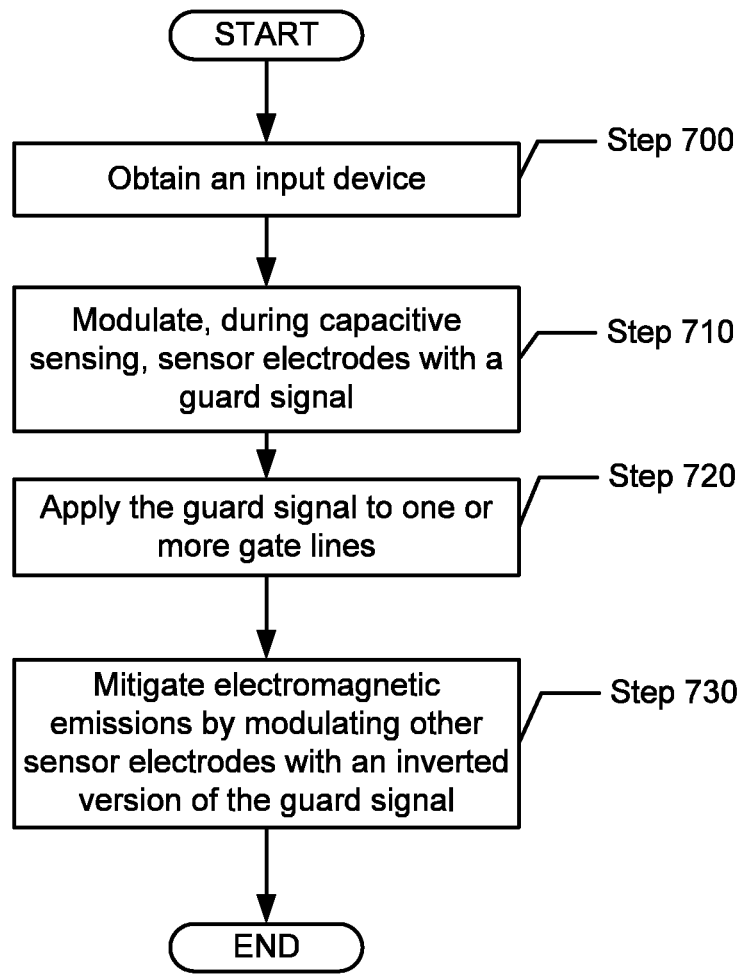

FIG. 7 shows a flowchart in accordance with one or more embodiments. The flowchart of FIG. 7 depicts a method for operating an input device (e.g., input device (200)). One or more of the steps in FIG. 7 may be performed by the components of the processing system (210), discussed above in reference to FIG. 2. In one or more embodiments, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7.

Initially, an input device is obtained (Step 700). The input device includes multiple sensor electrodes coupled to AFEs of a processing system. The input device may also include a display screen along with gate lines and source lines used to update the display screen. Moreover, all or some of the sensor electrodes may correspond to VCOM segments also involved in updating the display screen.

In STEP 710, some or all of the sensor electrodes are used to perform transcapacitance sensing. This may include modulating some of the sensor electrodes with a guard signal. Modulating the sensor electrodes with the guard signal may result in electromagnetic emissions being observed/measured at some distance from the input device (200) (e.g., by a remote antenna). Capacitance sensing may be performed when the input screen, if present, is not updating.

In STEP 720, during the transcapacitance sensing, the guard signal may also be applied to the gate lines and/or the source lines. By applying the guard signal to the gate lines and/or source lines, it is less likely that the sensor electrodes will capacitively couple with the gate lines and/or source lines, and thus less likely that the processing system will falsely identify the presence of an input object. Modulating the gate lines with the guard signal may result in electromagnetic emissions being observed/measured at some distance from the input device (200) (e.g., by a remote antenna).

In Step 730, an attempt is made to mitigate the electromagnetic emissions. Specifically, this includes modulating some of the sensor electrodes with an inverted version of the guard signal. Modulating the electrodes with the inverted version of the guard signal will generate electromagnetic emissions that mitigate (i.e., reduce or even cancel) the electromagnetic emissions resulting from the modulation of the sensor electrode (and gate lines) with the guard signal.

Thus, the embodiments and examples set forth herein were presented in order to best explain various embodiments and their particular application(s) and to thereby enable those skilled in the art to make and use the embodiments. However, those skilled in the art will recognize that the foregoing description and examples have been presented for the purposes of illustration and example only. The description as set forth is not intended to be exhaustive or to be limiting to the precise form disclosed.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A processing system, comprising:
   first circuitry configured to modulate a first sensor electrode of a plurality of sensor electrodes with a guard signal,
      wherein the plurality of sensor electrodes is arranged in a sensing region; and
   second circuitry configured to mitigate electromagnetic emissions of the sensing region, the electromagnetic emissions resulting from modulating the first sensor electrode with the guard signal,
      wherein the mitigation is performed by modulating a circuit element with an inverted version of the guard signal.

2. The processing system of claim 1, wherein:
   the guard signal is applied to a gate line of a display screen, and
   modulating the circuit element with the inverted version of the guard signal also mitigates electromagnetic emissions resulting from applying the guard signal to the gate line.

3. The processing system of claim 2, wherein the circuit element is a conductive pathway comprising a set of segments that at least partially surround the plurality of sensor electrodes.

4. The processing system of claim 3, wherein the conductive pathway and the plurality of sensor electrodes are separated by a grounded pathway.

5. The processing system of claim 3, wherein the second circuitry is further configured to:
   determine a resistance of the conductive pathway; and
   execute at least one selected from a group consisting of:
      determining, based on the resistance, a temperature associated with the input device; and
      determining, based on the resistance, a bending force applied to the input device by a user.

6. The processing system of claim 1, wherein:
   the circuit element is a second sensor electrode of the plurality of electrodes;
   the first circuitry comprises an analog front-end (AFE) comprising an operational amplifier comprising:
      a first terminal coupled to the first sensor electrode; and
      a second terminal driven by the guard signal; and
   the second circuitry comprises driver circuitry configured to modulate the second sensor electrode by driving the inverted version of the guard signal onto the second sensor electrode.

7. The processing system of claim 1, wherein:
   the circuit element is a second sensor electrode of the plurality of electrodes;
   the first circuitry comprises a first analog front-end (AFE) comprising a first operational amplifier comprising:
      a first terminal coupled to the first sensor electrode; and
      a second terminal driven by the guard signal; and
   the second circuitry comprises a second AFE comprising a second operational amplifier comprising:
      a first terminal coupled to the second sensor electrode; and
      a second terminal driven by the inverted version of the guard signal.

8. The processing system of claim 7, further comprising determination circuitry configured to determine a position of an input object based on an output of at least one selected from a group consisting of the first AFE coupled to the first sensor electrode and the second AFE coupled to the second sensor electrode.

9. The processing system of claim 1, wherein the guard signal and the inverted version of the guard signal have different amplitudes.

10. A method comprising:
    modulating a plurality of sensor electrodes arranged in a sensing region with a sensing signal;
    applying a guard signal to a gate line associated with a display screen; and
    reducing, by modulating a conductive path with an inverted version of the guard signal, electromagnetic emissions of the sensing region, the electromagnetic emissions resulting from both modulating the plurality of sensor electrodes with the sensing signal and applying the guard signal to the gate line,
    wherein the conductive path at least partially surrounds the plurality of sensor electrodes.

11. The method of claim 10, wherein the conductive pathway and the plurality of sensor electrodes are separated by a grounded pathway.

12. A method associated with a processing system, the method comprising:
    modulating a first sensor electrode disposed in a sensing region with a guard signal; and
    reducing electromagnetic emissions of the sensing region, the electromagnetic emissions resulting from modulating the first sensor electrode with the guard signal,
       wherein the mitigation is performed by modulating a second sensor electrode with an inverted version of the guard signal.

13. The method of claim 12, further comprising:
applying the guard signal to a gate line associated with a display screen,
wherein modulating the second sensor electrode with the inverted version of the guard signal also mitigates electromagnetic emissions resulting from applying the guard signal to the gate line.

14. The method of claim 13, wherein:
the second sensor electrode is modulated by driving the inverted version of the guard signal onto the second sensor electrode; and
the processing system comprises an analog front-end (AFE) comprising:
a first terminal coupled to the first sensor electrode; and
a second terminal driven by the guard signal.

15. The method of claim 13, wherein:
the processing system further comprises a first analog front-end (AFE) and a second AFE;
the first sensor electrode is coupled to the first AFE and is modulated by driving a terminal of the first AFE with the guard signal;
the second sensor electrode is coupled to the second AFE; and
the second sensor electrode is modulated by driving a terminal of the second AFE with the inverted version of the guard signal.

16. The method of claim 15, further comprising:
determining a position of an input object based on an output of at least one selected from a group consisting of the first AFE and the second AFE.

17. An input device, comprising:
a plurality of sensor electrodes arranged in a sensing region; and
a processing system configured to:
modulate a first sensor electrode of the plurality of sensor electrodes with a guard signal; and
mitigate electromagnetic emissions of the sensing region resulting from modulating the first sensor electrode with the guard signal,
wherein the mitigation is performed by modulating a circuit element with an inverted version of the guard signal.

18. The input device of claim 17, wherein the circuit element is a conductive pathway comprising a set of segments that at least partially surround the plurality of sensor electrodes.

19. The input device of claim 17, wherein the circuit element is a second sensor electrode of the plurality of electrodes and the processing system comprises:
an analog front-end (AFE) comprising an operational amplifier comprising:
a first terminal coupled to the first sensor electrode; and
a second terminal driven by the guard signal; and
driver circuitry configured to modulate the second sensor electrode by driving the inverted version of the guard signal onto the second sensor electrode.

20. The input device of claim 17, wherein the circuit element is a second sensor electrode of the plurality of electrodes and the processing system comprises:
a first analog front-end (AFE) comprising a first operational amplifier comprising:
a first terminal coupled to the first sensor electrode; and
a second terminal driven by the guard signal; and
a second AFE comprising a second operational amplifier comprising:
a first terminal coupled to the second sensor electrode; and
a second terminal driven by the inverted version of the guard signal.

21. The input device of claim 17, further comprising:
a gate line and a source line for operating a display screen,
wherein the processing system is further configured to apply the guard signal to the gate line, and
wherein modulating the circuit element with the inverted version of the guard signal also mitigates electromagnetic emissions resulting from applying the guard signal to the gate line.

* * * * *